United States Patent [19]

Wilson

[11] 4,436,223

[45] Mar. 13, 1984

[54] DEVICE FOR RECORDING THE DISPENSING OF FLUIDS

[76] Inventor: Jerry L. Wilson, 2810 E. 46th St., Chattanooga, Tenn. 37407

[21] Appl. No.: 231,244

[22] Filed: Feb. 3, 1981

[51] Int. Cl.³ .................... B67D 5/22; G01F 11/26
[52] U.S. Cl. .................................. 222/36; 222/40; 235/21; 340/603
[58] Field of Search ................. 222/36, 37, 38, 40; 340/603; 235/92 FC

[56] References Cited

U.S. PATENT DOCUMENTS

| | | | |
|---|---|---|---|
| 2,808,178 | 10/1957 | Grado et al. | 222/38 |
| 3,164,300 | 1/1965 | Dousette | 222/153 |
| 3,170,597 | 2/1965 | Reichenberger | 222/36 |
| 3,181,729 | 5/1965 | Milonas et al. | 222/36 |
| 3,341,073 | 9/1967 | Arps | 222/36 |
| 3,348,736 | 10/1967 | Dawes | 222/38 |
| 3,419,187 | 12/1968 | Bazarnic | 222/36 |
| 3,754,220 | 8/1973 | Sztamler et al. | 340/609 |
| 3,796,348 | 3/1974 | Zipper | 222/38 |
| 4,034,757 | 7/1977 | Glover | 128/260 |
| 4,265,370 | 5/1981 | Reilly | 222/37 X |
| 4,278,186 | 7/1981 | Williamson | 222/36 |

FOREIGN PATENT DOCUMENTS 1423357  2/1976  United Kingdom .................. 222/36

Primary Examiner—Joseph J. Rolla
Assistant Examiner—Frederick R. Handren
Attorney, Agent, or Firm—Alan Ruderman

[57] ABSTRACT

A device is provided for recording the dispensing of a predetermined measure of a conductive fluid, e.g. water, alcoholic beverage, etc., from a container outlet. The device comprises an electrical signal generator for generating an electrical signal, e.g. a DC battery, and an electrical counting means disposed to receive this electrical signal. An electrical circuit is disposed to conduct the electrical signal from the generator to the counting means. The electrical circuit includes a switch means which is responsive to the contacting of the fluid from the outlet across a pair of electrical conductors within the outlet. When the fluid flows across the electrical conductors the electrical signal is transmitted to the counting means to record the dispensing of the predetermined measure of fluid.

5 Claims, 4 Drawing Figures

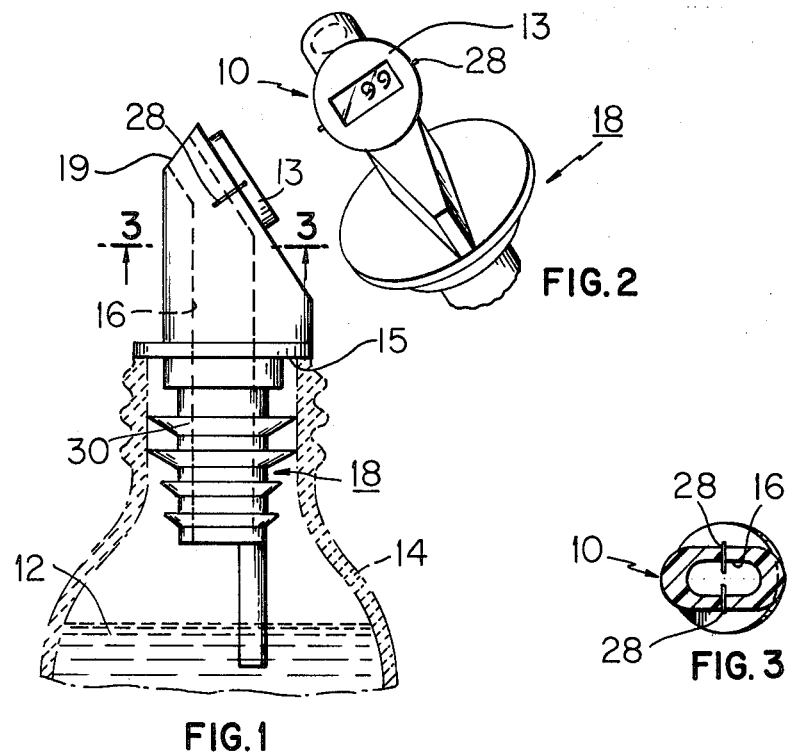
FIG. 1
FIG. 2
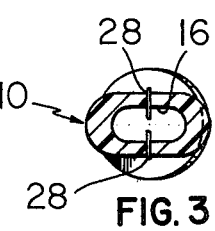
FIG. 3
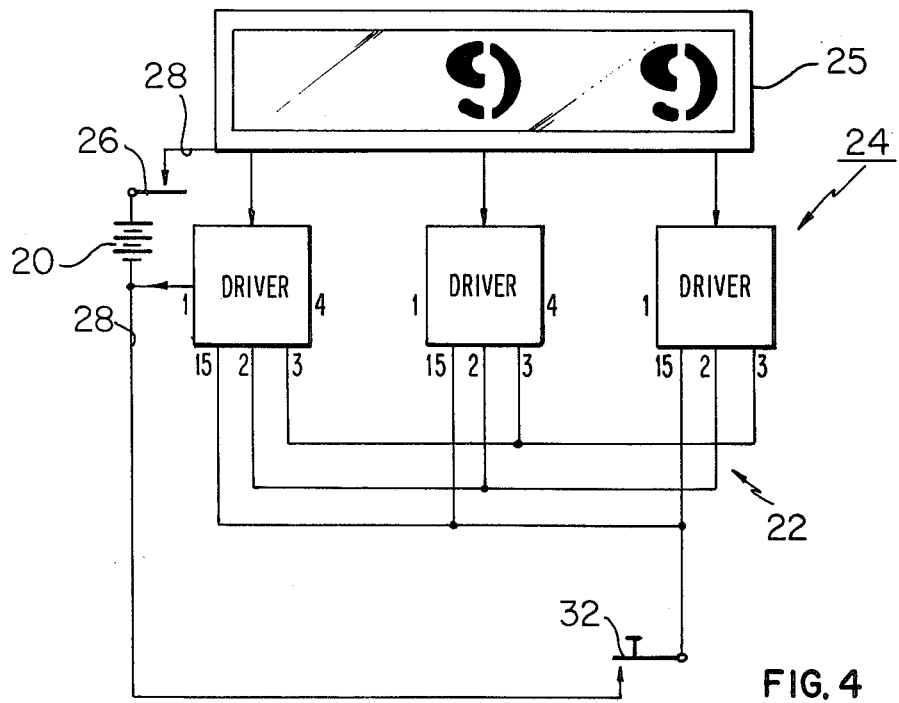
FIG. 4

DEVICE FOR RECORDING THE DISPENSING OF FLUIDS

BACKGROUND OF THE INVENTION

1. Field of the Invention

The present invention relates to a device for recording the dispensing of a predetermined measure of fluid, e.g. alcoholic beverage, water, etc. from a container outlet. The device is used in conjunction with the conventional dispensing devices used on such containers, i.e. bottles, and is for the purpose of keeping an accounting of the quantity of fluid which is dispensed from the container.

2. Prior Art

It is often highly desirable to keep an accurate account of the quantity of fluid dispensed from a container. One method of keeping an account of the fluid in a container is to mark the level of the fluid therein from time to time and record the differences. This method is highly inaccurate and susceptible to pilferage, cheating, etc.

It is very desirable to automatically record the dispensing of such fluid. It is a problem to automatically maintain inventory records with respect to the dispensing of such fluids and their relationship to receipts. This problem is particularly difficult to solve with respect to liquors poured from bottles during the production of mixed drinks, and accordingly, it has been difficult to determine the efficiency of barkeepers and the accuracy of records. Barkeepers may have a tendency to overpour their liquor when making mixed drinks or they may fail to collect for such drinks through inadvertence, accident, or mistake.

The present invention provides a means by which each open bottle in an establishment will always display the quantity that has been dispensed from the bottle. Thus a running inventory can be easily kept.

The present invention also includes a means by which a proprietor of such an establishment can be assured that no additions to the contents of the bottles are made after it is opened. This assures the customer of receiving the quality of beverage which he desires and also enables the proprietor to rely on his inventory account as an accurate measure of the number of drinks sold.

While the present invention is advantageously employed for the particular purpose suggested above, it is in no way limited thereto. The present invention is also useful in connection with exotic or expensive fluids which are used for medical or scientific purposes. There are a number of liquids which are of such a nature so as to require Federal or State supervision in their distribution. A device which would insure that a container has not been refilled or tampered with, and at the same time would furnish means for keeping an accurate account of the amount of fluid dispensed from the container is highly useful in connection with these liquids.

The prior art is replete with many devices which meter and/or measure fluids from a bottle or other such container, for example the following U.S. patents:

U.S. Pat. No. 2,808,178 to DiGrado et al;
U.S. Pat. No. 3,164,300 to Dousette;
U.S. Pat. No. 3,170,597 to Reichenberger;
U.S. Pat. No. 3,181,729 to Milonas et al;
U.S. Pat. No. 3,341,073 to Arps et al;
U.S. Pat. No. 3,348,736 to Dawes;
U.S. Pat. No. 3,419,187 to Bazarnic;
U.S. Pat. No. 3,796,348 to Zipper; and
U.S. Pat. No. 4,034,757 to Glover.

All of these devices are generally very complicated, expensive have numerous parts and do not provide the ease of installation, simplicity and inexpensiveness of the device described herein.

OBJECTS AND SUMMARY OF THE INVENTION

A specific object of the present invention is to provide a device for recording the dispensing of fluid.

Still another object is to provide a device for recording the dispensing of a conductive fluid from the outlet of a container.

Still another object is to provide a device for recording the dispensing of a predetermined measure of fluid from such container outlet.

Another object of this invention is to provide a device which can be attached to a conventional dispensing means used for dispensing a predetermined measure of fluid.

Yet another object of this invention is to provide a device for recording the dispensing of an alcoholic beverage from a bottle and to keep an accurate account thereof of the number of drinks dispensed.

Yet another object of this invention is to provide a device which is simple in construction and inexpensive and uses conventional microcircuitry available today to record accurately the dispensing of fluids.

The foregoing, and other objects are achieved by a device for recording the dispensing of a predetermined measure of conductive fluid from a container outlet, comprising:

an electrical signal generator for generating an electrical signal;

an electrical counting means disposed to receive the electrical signal;

an electrical circuit disposed to conduct the electrical signal from the generator to the counting means, said electrical circuit including a switch means which is responsive to the contacting of the fluid from the outlet across the pair of electrical conductors within the outlet, whereby when the fluid flows across the electrical conductors the electrical signal is transmitted to the counting means to record the dispensing of the predetermined measure of fluid.

The foregoing, together with other objects, features and advantages will be more apparent after referring to the following specification and the accompanying drawings.

BRIEF DESCRIPTION OF THE DRAWINGS

FIG. 1 is a side elevation of one embodiment of the device of this invention attached to a dispensing means which is attached to a container with parts thereof illustrated in section;

FIG. 2 is a fragmentary top perspective view of the device depicted in FIG. 1;

FIG. 3 is a sectional view of the device of this invention in use, taken along line 3—3 of FIG. 1; and FIG. 4 is a schematic diagram of the electrical circuit and counter means used in the device of this invention.

DETAILED DESCRIPTION OF THE INVENTION

Referring to FIGS. 1-3, the device of this invention, generally designated (10) is designed for recording the dispensing of a predetermined measure of a conductive fluid (12) from a container (14) having an outlet (15) at the top through which the fluid (12) is dispensed. The device (10) can be used to measure alcoholic beverage drinks which contain generally, a mixture of alcohol and water. The device (10) however may be utilized to measure any fluid which is conductive. Most fluids used for drinking contain water with impurities therein and are thus conductive.

The device (10) may be used with any conventional dispensing means (18) known in the art. Some of such dispensing means are described in the aforementioned U.S. patents. The dispensing means (18) depicted in FIGS. 1-3 is a conventional type which is disposed through the outlet (15) into the container and dispenses a predetermined measure of fluid (12) from the container (14) through a conduit 16 extending through the dispenser and communicating the interior of the container with a spout (19) on the exterior end of the dispenser. Typically, for alcoholic beverages this is about one ounce of fluid (12). The details of construction of such a dispensing means (18) are not critical to this invention and are well known. The device (10) of this invention may be utilized with practically any type dispensing means (18) which dispenses a predetermined measure of fluid (12).

The device (10) comprises a small housing (13) within which an electrical energy source, such as battery (20) is mounted for providing an electrical signal. Typically, and preferably, this electrical source is a DC battery, which emits a certain prescribed voltage.

Device (10) is further comprised of an electrical counting means (24) disposed in the housing (13) to receive the electrical signal. As shown in FIG. 4 the electrical counting means is a digital counter chip, for example No. 4026 from RCA Corporation. Typically there would be three such chips to enable one to perform counting up to 999 which is recorded and may be displayed as desired on a count display (25).

The device (10) further has an electrical circuit (22) for example as shown in FIG. 4, disposed within the housing (13) which is disposed to conduct the electrical signal from the energy source, e.g. the battery (20), to the counting means (24).

The electrical circuit (22) includes a switch-like means (26) which when mounted on the dispensed is a small gap providing an open circuit across a pair of electrical conductors (28).

Preferably, as illustrated, the housing within which the signal generator (20), the counting means (24) the electrical circuit (22) and the switch means (26) are contained is a circular container which is approximately ⅛ inch thick and less than one inch in diameter, and securely mounted to the exterior of the dispensing means (18). The ends of the electrical conductors (28) are led through small holes formed in the dispensing means (18) into the conduit (16) adjacent the spout 19. When the ends of the conductor (28) are positioned within the conduit they are disposed apart to form a small gap as noted above. The display for the counting means may be lit up by pressing button (32).

Thus, when the fluid (12) flows across the ends of the electrical conductors (28), the presence of the fluid between the gap closes the circuit so that the electrical signal from the battery (20) is transmitted to the counting means (24) to record the dispensing of the predetermined measure of fluid.

Preferably, as indicated in FIG. 1, the dispensing means (18) has a locking means (30) mounted therein to prevent tampering with the dispensing means (18) and container (14).

In use, each time the container (14) is tilted to dispense the predetermined measure of fluid (12) the fluid (12) closes the gap between the electrical conductors (28) thus permitting the electrical signal to flow through the electrical circuit (22) to the counting means (24) to register the dispensing of a drink.

Although one embodiment has been shown and described it will be obvious that other adaptations and modifications can be made without departing from the true scope and spirit of this invention.

What is claimed is:

1. In combination, a dispenser for dispensing a predetermined measured unit of conductive fluid from a container when the container is tipped, and a device for recording the number of measured units dispensed by the dispenser, said dispenser having a housing including an outlet spout, means including an inlet for entering into said container, and a conduit communicating said inlet and said outlet, said device comprising, a casing mounted on the exterior of the housing of said dispenser, a pair of electrical conductors extending from the casing and disposed in spaced apart disposition within said conduit adjacent said outlet spout to form a gap, whereby whenever said container is tipped fluid is presented over said conductors to provide an electrical path across said gap, and electrical circuit means disposed within said casing and connected across said conductors, said circuit means including a source of electrical energy, and an electrical counting means for counting and recording the number of times the electrical path across said gap occurs and thereby the number of predetermined measured units dispensed by said dispenser.

2. In the combination as recited in claim 1, wherein the source of electrical energy is a DC battery.

3. In the combination as recited in claim 1, wherein said counting means comprises a plurality of digital counter microcircuit chips.

4. In the combination as recited in claim 1, wherein the fluid is an alcoholic beverage.

5. In the combination as recited in claim 1, wherein said electrical counting means includes display means for displaying said number of units dispensed, said display means being visibly perceptible through the casing.

* * * * *